United States Patent [19]

Sayers

[11] Patent Number: 4,890,747
[45] Date of Patent: Jan. 2, 1990

[54] MAGNETIC TAPE STORAGE SYSTEM

[75] Inventor: Richard C. Sayers, Opelika, Ala.

[73] Assignee: Ampex Corporation, Redwood City, Calif.

[21] Appl. No.: 243,570

[22] Filed: Sep. 12, 1988

[51] Int. Cl.⁴ .............................................. A47F 5/08
[52] U.S. Cl. ...................................... 211/106; 211/133
[58] Field of Search ................. 211/87, 106, 181, 189, 211/133

[56] References Cited

U.S. PATENT DOCUMENTS 4,234,094 11/1980 Jorgensen ..................... 211/106 X
4,340,144 7/1982 Cousins .............................. 211/87

FOREIGN PATENT DOCUMENTS 1429662 11/1968 Fed. Rep. of Germany ...... 211/106
6606178 11/1966 Netherlands ....................... 211/106
6607163 12/1966 Netherlands ....................... 211/106
1230856 5/1971 United Kingdom ................ 211/106

Primary Examiner—Robert W. Gibson, Jr.
Attorney, Agent, or Firm—Harry G. Thibault; Richard P. Lange

[57] ABSTRACT

A storage rack for use in a wall-mounted system, the storage rack including an array or horizontally aligned, generally equally spaced, generally parallel storage rail provided on a rectangular frame. Rack support brackets are provided behind the frame so that the frame can be mounted flush with the wall with the brackets displaced from a central horizontal access of the rack, so that a serial arrangement of storage racks, a first rack can be mounted on the wall top to bottom with a second rack mounted bottom to top so that the brackets of the first rack are so displaced from the bracket of the second rack as to support the second rack, with the arrangement of parallel storage rails so positioned as to continue the linear alignment of rails from one rack to the next.

3 Claims, 3 Drawing Sheets

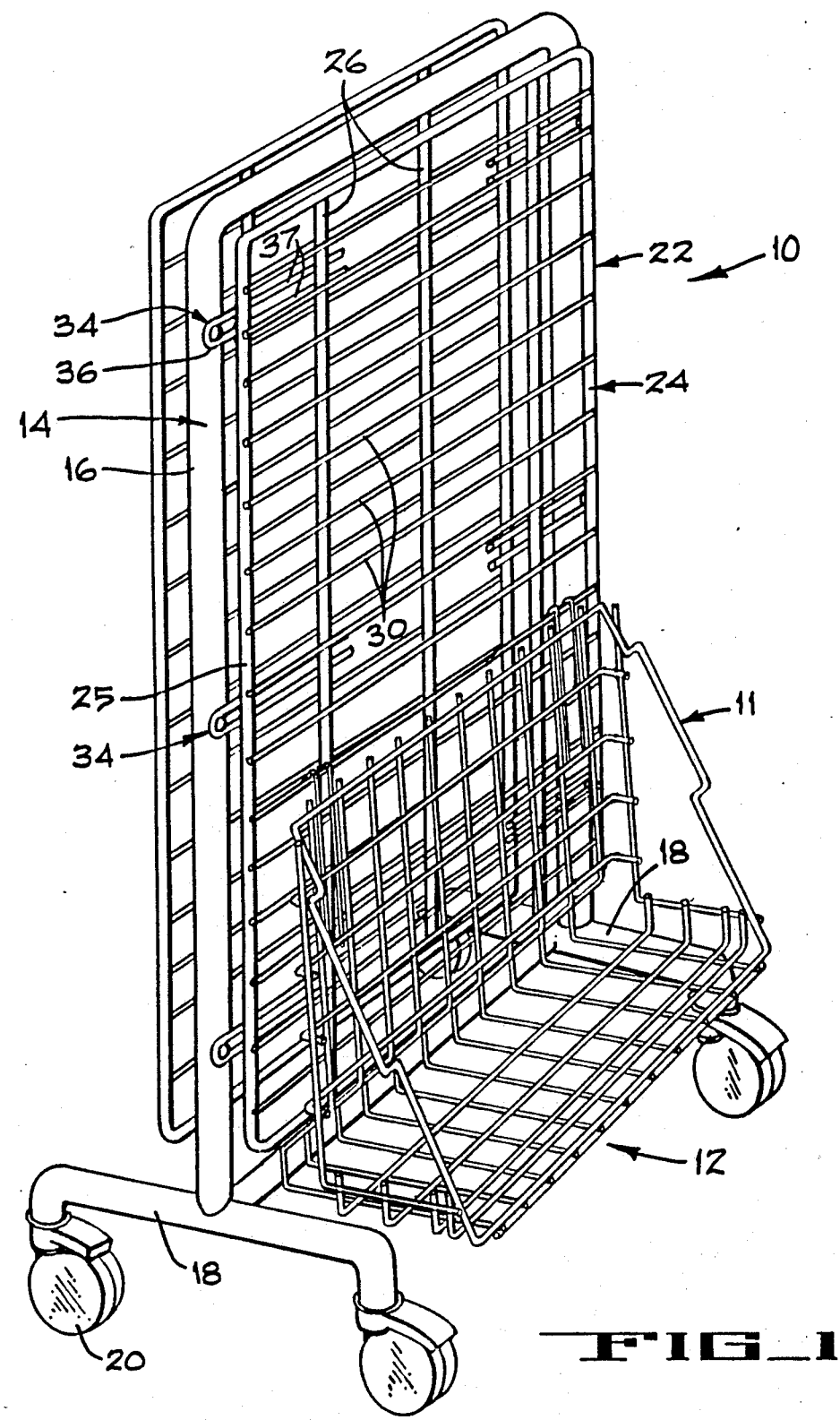
FIG_1

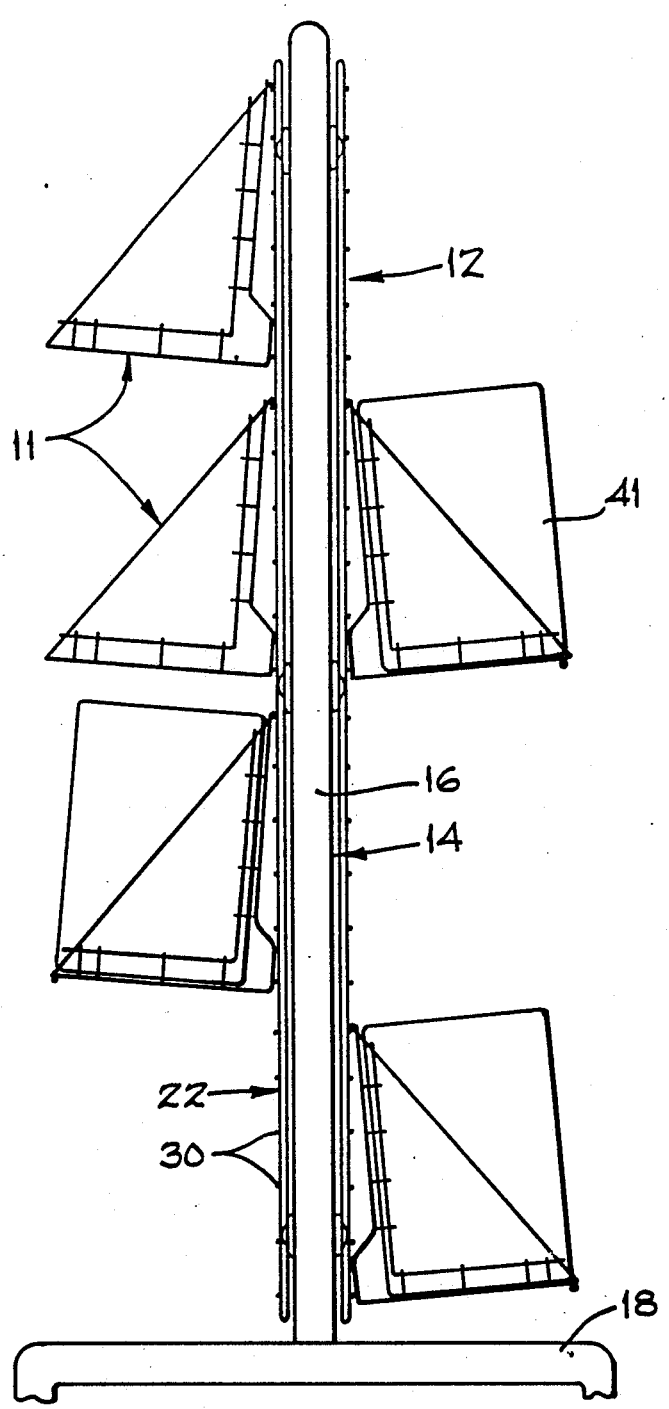
FIG_2

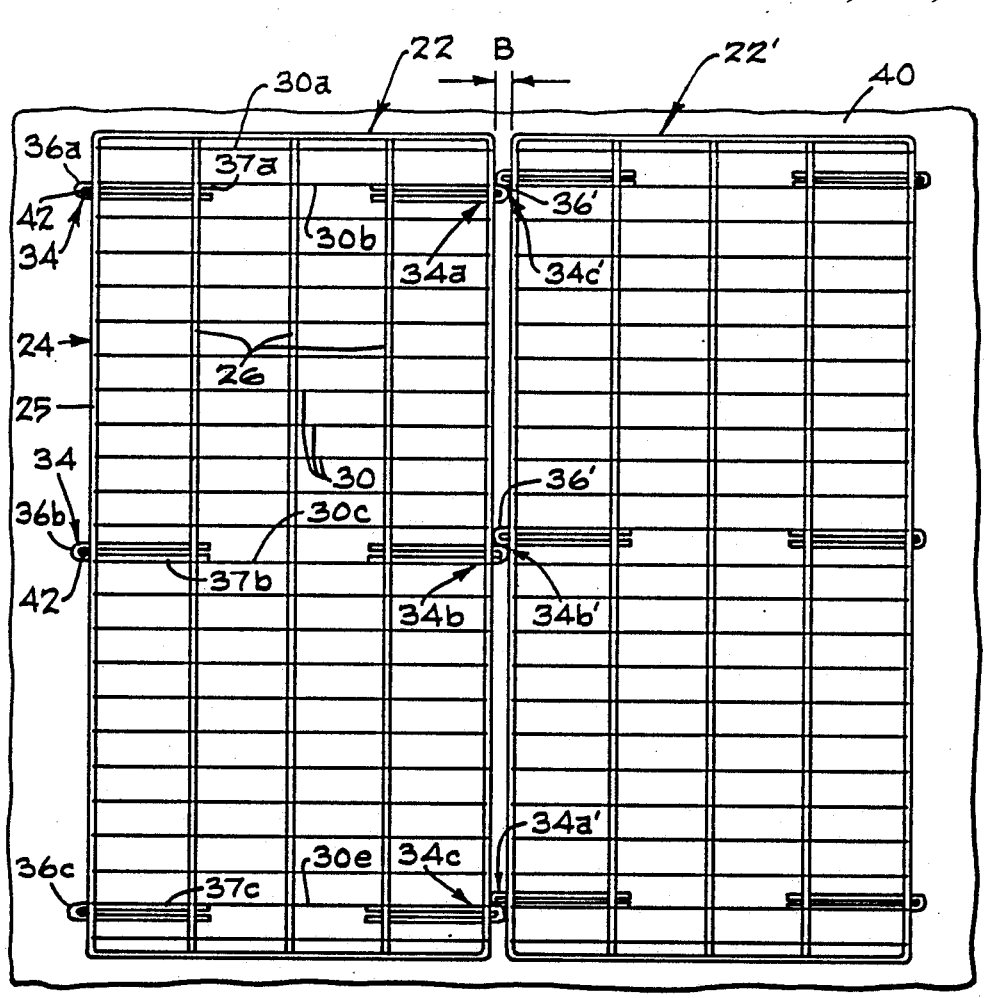
FIG_3
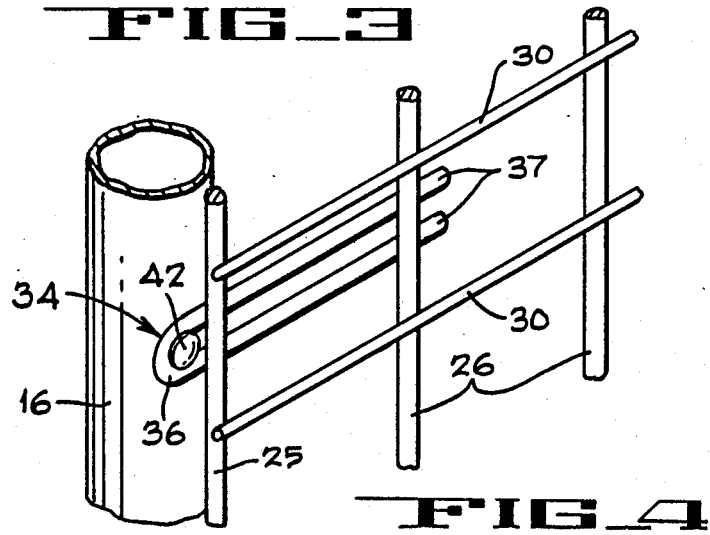
FIG_4

MAGNETIC TAPE STORAGE SYSTEM

The present invention pertains to magnetic tape storage systems generally and in particular to a highly versatile storage system including a mounting rack.

The use of video tape and video tape cassettes in a television production setting or post-production setting is considerable. To bring some significant level of order to this proliferation of magnetic tape is an absolute necessity in any production or post-production facility. Tape must be stored in libraries and must also be available for orderly transfer to other smaller storage areas such as recording areas, editing areas, or the like. Accordingly, a versatile storage system is a must.

However, prior to the present invention, a storage system usable for a library setting was not adaptable to a rolling storage system, nor was a rolling storage system adaptable for use in a minimal storage area such as a single office or an editing room. The magnetic cassette storage system of the present invention offers a versatility heretofore unknown.

At the core of the system is a multi-purpose storage rack which can be easily used in a library setting to provide an array of successive wall-mounted racks, such racks uniquely configured to provide minimal spacing between individual racks, as well as to provide a unitary alignment for the storage rails mounted on the racks and associated with the array. Such racks may be mounted equally as well on the supporting frame of a mobile cart as they are mounted on a wall space.

Associated with the rack storage system is a wire-form cassette storage basket, configured for mounting on the storage rack. The wire-form basket incorporates engaging hooks for securing the basket to a first or upper storage rail, and a basket support elbow, engaging a second or lower rail, to incline the basket outwardly from the rack and upwardly from the horizontal to minimize spilling of the cassettes from the basket. The basket also incorporates a unique bottom structure which protects cassettes of all sizes by preventing them from falling from the basket. The structure of the basket and its inventive features and the particular advantages they provide will be discussed in greater length in a related patent application.

The present invention provides a unique rack structure particularly well-suited for the serial mounting of storage racks in a library setting, such racks readily adaptable to a mobile storage cart. The storage rack of the present invention includes a unique construction which disposes a plurality of generally parallel storage rails in an equi-spaced array on a generally rectangular frame. Side mounted storage brackets are mounted behind the frame so that the rack can be mounted with the brackets flush to the wall. Moreover, the brackets are so mounted with respect to the rack that a first rack can be mounted top to bottom and an adjacent rack bottom to top to dispose the mounting brackets of the second rack behind a side frame of the first rack to minimize the spacing therebetween. Further, the horizontal alignment of equispaced, parallel rails is continuous from rack to rack. Moreover, the side brackets are so positioned that in the preferred configuration two outer racks can support a middle rack with minimal use of fasteners.

These advantages and others should become readily apparent upon consideration of the detailed description of the present invention as set forth below, particularly if the detailed description is considered with the accompanying drawings described below.

DESCRIPTION OF THE DRAWINGS

FIG. 1 is a perspective view of a mobile cart incorporating the cart mounted rack system of the present invention;

FIG. 2 is a side elevation of the cart of FIG. 1, with a plurality of cassette storage baskets in place;

FIG. 3 is a front elevation of a pair of racks shown in a wall mounted configuration; and FIG. 4 is a detail of the mounting brackets securing the racks to the wall.

DETAILED DESCRIPTION OF THE INVENTION

As best seen in FIGS. 1 and 2 the storage system 10 of the present invention includes a mobile cart 12 comprising a generally rectangular tubular frame 14 having opposite side rails 16 each mounted on a bottom support rail 18. Each bottom support 18 includes casters or similar rolling support members 20 at opposite ends of the support rails 18.

Mounted on the frame 14 is a storage rack 22. The rack 22 is a relatively heavy structure and designed to insure substantial rigidity. The rack 22 is generally rectangular to conform to the shape of the frame 14 of the cart 12. The periphery of the rack 22 is defined by a relatively heavy rod or wire at least $\frac{1}{4}''$ in diameter which forms the rectangular outer frame or support rail 24 of the rack 22. Vertical support posts 26, generally of the same diameter as the outer frame 24, are suitably secured between the top and bottom of frame 24 to extend therebetween in a generally parallel, equi-spaced array, to be suitably fastened in place, as by welding.

To complete the grid of the rack 22, storage rails 30, of somewhat smaller diameter than the posts 26, are disposed in a parallel, equi-spaced, generally horizontal array across the face of the rack 22, and suitable secured, as by welding, to side rails 25 of the outer support rail 24 and to the vertical support posts 26.

Completing the rack 22 are a series of side mounting brackets 34 secured to the side rails 25 of frame 24. Each mounting bracket 34 consists of a loop 36 (FIG. 4) formed of a single wire generally of the same diameter as the diameter of the wire forming the side rails 25 of the frame 22. The loop 36 is closed by the side rail 25 with inwardly extending top and bottom legs or wires 37 of the loop 36 mounted behind the side rail 25 and extending inwardly to also be secured behind an outer support post 26. As shown in FIG. 2, cassette storage baskets 11 are mounted on the rails 30, the baskets 11 can be of varying sizes to hold cassettes 41, also of varying sizes.

The alignment of the side brackets 34 with respect to the side rails 25 and the rack 22 should be noted (FIG. 3). In the configuration of the preferred embodiment three vertical support posts 26 are equi-spaced between the side rails 25 and twenty-four storage rails 30 are equi-spaced from top to bottom of the frame 24 beginning from a top storage rail 30a. Note, however, that the upper leg 37a of upper loop 36a is aligned slightly below an upper storage rail 30b, disposed adjacent the top rail 30a and that an upper leg 37c of a lower loop 36c is disposed below a lower storage rail 30d, disposed just above a bottom storage rail 30e. Note also that a lower leg 37b of a mid-frame bracket 34b is disposed above a mid storage rail 30c. That is to say that the side mounting brackets 34 are not symetrically placed on the rack 22, even though they are disposed in a generally parallel alignment, from one side of the rack 22 to the other. The reason for the asymmetric placement of the side brackets 34 with respect to the rack 22 will become apparent on a further consideration of FIG. 3.

Although the positioning of the loop 36 may not be particularly relevant on the single rack usage of the cart 12 shown in FIGS. 1 and 2 the asymmetric positioning of the mounting brackets 34 becomes extremely significant when considered in a wall-mounted system as shown in FIG. 3. For example, a rack 22 may be mounted top to bottom to a wall 40 as shown in FIG. 2 with suitable fasteners 42 securing the rack 22 to the wall 40 by the side brackets 34.

When a series of wall-mounted racks 22 are contemplated, the next rack 22' in the series would be mounted bottom to top, wherein the side loops 36' of the mounting brackets 34' overlie the side loops 36 of the mounting brackets 34 of the rack 22. That is, upper bracket 34c', mid-bracket 34b' and lower bracket 34a' of the inverted rack 22' overlie respective side brackets 34a, 34b and 34c of the rack 22. Or the loops 34' of rack 22' can be slid behind the side rail 25 of the rack 22 to assure a minimum spacing (B) between the racks 22 and 22'. Further, by continuing the top to bottom, bottom to top sequence of wall-mounting the racks 22, minimum spacing can be achieved for an entire series of wall-mounted racks 22. Also a first rack 22 can partially support an adjacent rack 22' thus minimizing the need for fasteners.

For example, if a third rack (not shown) were mounted adjacent to rack 22' in a top-to-bottom orientation, such an arrangement would permit the side brackets 34 of the outer racks 22 to support the inner rack 22', with no need to use fasteners 42 to secure the rack 22' to wall 40, if the rack 22'is sized appropriately, so that the fastener 42 associated with the outer rack 22 could support not only the racks 22, but also the additional weight associated with the middle rack 22' and its stored load.

Note however that the most significant effect of the asymmetric placement of brackets 34 on the rack 22 is that such placement continues the generally parallel alignment of storage rails 30 from one wall-mounted rack 22 to the next, to greatly facilitate handling of the video tape materials stored in the above-described system.

Having described the particular embodiment of the present invention it should be understood that other alternatives can be achieved within the language of the description set forth. Accordingly the scope of the invention is defined by the appended claims.

What is claimed is:

1. In a wall-mounted rack storage system, a storage rack comprising a primary storage area defined by a rectangular frame and an array of horizontally aligned, generally equally spaced, generally parallel, storage rails mounted to the frame, each rail disposed between opposite sides of the frame; and rack support brackets mounted on the side of the frame opposite the storage rails, the brackets mounted on one side of the frame in generally horizontal alignment with the brackets mounted on the other side of the frame, but displaced from a central horizontal axis of the rack, so that in a serial arrangement of more than one storage rack, a second rack placed bottom to top can be mounted adjacent a first rack mounted top to bottom, disposing the side brackets of the second rack above and supported by the side brackets of the first rack to minimize the spacing therebetween, and to extend the generally horizontal, equi-spaced, parallel array of storage rails from the first rack to the second rack.

2. A storage rack as claimed in claim 1 wherein the rectangular frame includes an array of vertical support posts connected between the top and bottom of the frame and equally spaced from one side of the frame to the other in a generally parallel array.

3. A storage rack as claimed in claim 2 wherein the rack support bracket comprises a loop closed by one side of the frame, with a rearward extension of the loop connected to an adjacent support post of the frame.

* * * * *